United States Patent [19]
Pederson

[11] Patent Number: 5,400,201
[45] Date of Patent: Mar. 21, 1995

[54] SERVO BURST PATTERN FOR REMOVING OFFSET CAUSED BY MAGNETIC DISTORTION AND METHOD ASSOCIATED THEREWITH

[75] Inventor: Richard J. Pederson, Boulder, Colo.

[73] Assignee: SyQuest Technology, Inc., Fremont, Calif.

[21] Appl. No.: 143,214

[22] Filed: Oct. 25, 1993

[51] Int. Cl.⁶ .............................................. G11B 5/596
[52] U.S. Cl. ............................ 360/135; 360/77.08; 360/78.14
[58] Field of Search ............... 360/135, 131, 77.05, 360/77.02, 77.11, 77.01, 77.08, 78.14

[56] References Cited

U.S. PATENT DOCUMENTS

| | | | |
|---|---|---|---|
| 3,185,972 | 5/1965 | Sippel et al. | 340/174.1 |
| 3,534,344 | 10/1970 | Santana | 340/174.1 |
| 3,812,533 | 5/1974 | Kimura et al. | 360/77 |
| 4,027,338 | 5/1977 | Kril | 360/77 |
| 4,068,267 | 1/1978 | Inoue | 360/77.05 |
| 4,087,843 | 5/1978 | Louis et al. | 360/78 |
| 4,163,265 | 7/1979 | van Herk et al. | 360/77 |
| 4,238,809 | 12/1980 | Fujiki et al. | 360/77.05 |
| 4,380,034 | 4/1983 | Krake | 360/77 |
| 4,424,543 | 1/1984 | Lewis et al. | 360/135 |
| 4,524,398 | 6/1985 | Fujiki | 360/78 |
| 4,530,020 | 7/1985 | Sutton | 360/77 |
| 4,613,915 | 9/1986 | Crouse et al. | 360/77 |
| 4,669,003 | 5/1987 | Bell et al. | 360/77.05 |
| 4,669,004 | 5/1987 | Moon et al. | 360/77 |
| 4,812,929 | 3/1989 | Stewart et al. | 360/77.07 |
| 4,814,909 | 3/1989 | Brown et al. | 360/78.07 |
| 4,823,212 | 4/1989 | Knowles et al. | 360/77.08 |
| 4,890,172 | 12/1989 | Watt et al. | 360/77.04 |
| 4,920,462 | 4/1990 | Couse et al. | 360/78.04 |
| 4,987,355 | 1/1991 | Leaper et al. | 318/561 |
| 5,041,926 | 8/1991 | Ockerse et al. | 360/77.05 |
| 5,105,318 | 4/1992 | Tsuneta et al. | 360/77.01 |
| 5,117,408 | 5/1992 | Weispfenning et al. | 369/32 |
| 5,170,299 | 12/1992 | Moon et al. | 360/77.08 |
| 5,184,257 | 2/1993 | Koga et al. | 360/77.05 |
| 5,185,681 | 2/1993 | Volz et al. | 360/77.05 |

Primary Examiner—A. J. Heinz
Assistant Examiner—David L. Ometz
Attorney, Agent, or Firm—Lyon & Lyon

[57] ABSTRACT

An alternating "A/B" servo burst pattern for measuring and compensating for offset of the track centerline due to differential magnetic influence to the servo pattern, and a switching network to alternate the output of the servo system demodulators between the inverting and non-inverting terminals of a differential amplifier so that electrical distortion is minimized.

19 Claims, 3 Drawing Sheets

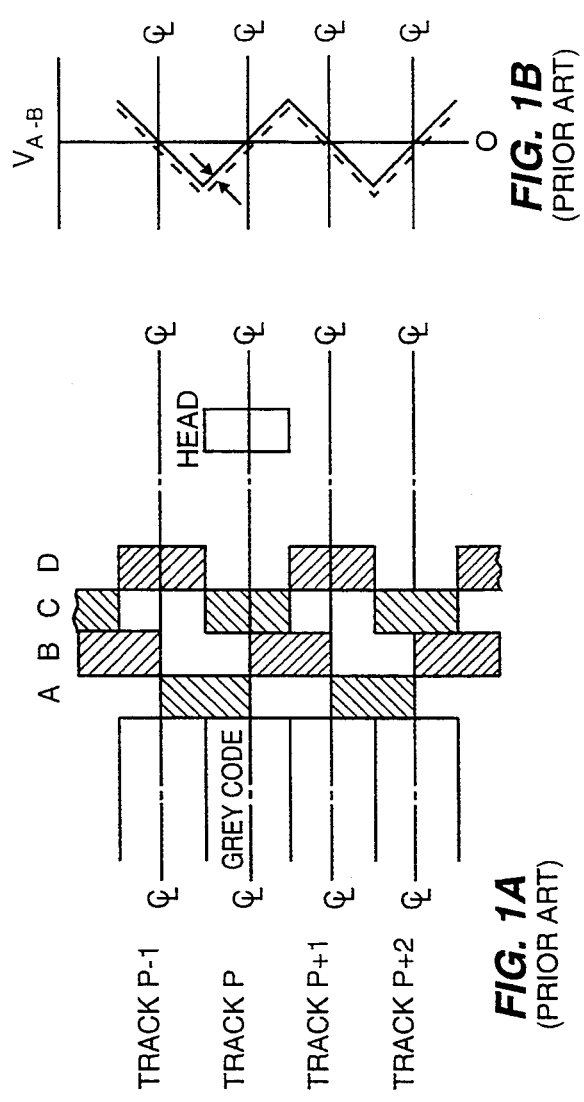
FIG. 1A (PRIOR ART)
FIG. 1B (PRIOR ART)
FIG. 1C (PRIOR ART)
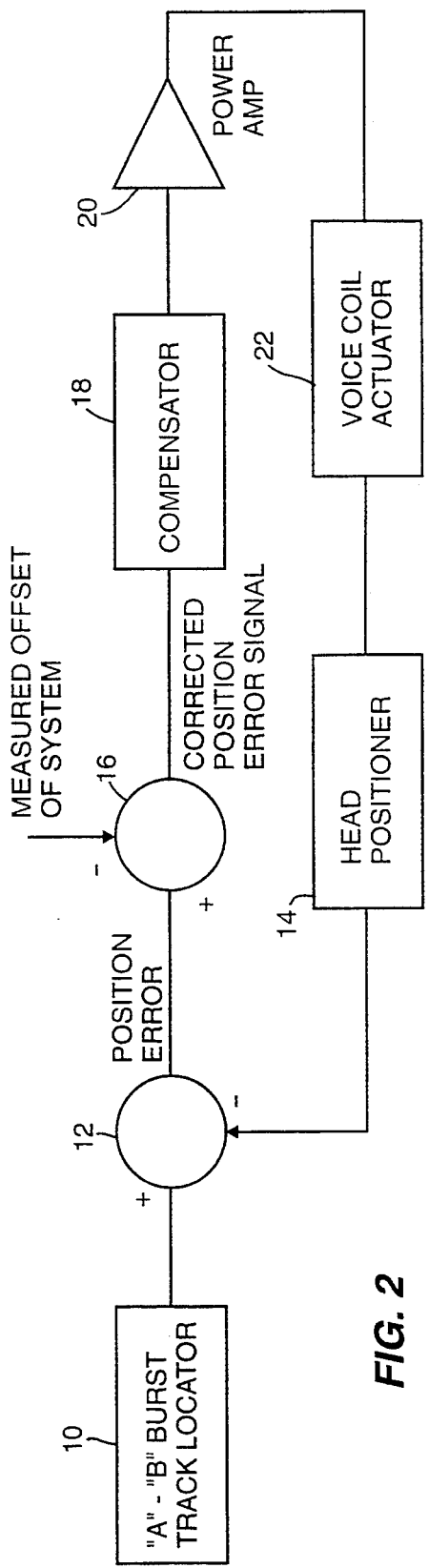
FIG. 2

X = DIFFERENCE IN BURST AMPLITUDE FOR ANY SERVO SECTOR = $(V_{A-B})$

ACTUAL POSITION ERROR TRACK FOLLOWING TO POSITION ERROR WITH ALTERNATING OFFSET f SAMPLE >> f TRACK FOLLOWING BANDWIDTH

SERVO BURST PATTERN FOR REMOVING OFFSET CAUSED BY MAGNETIC DISTORTION AND METHOD ASSOCIATED THEREWITH

TECHNICAL FIELD

The present invention generally relates to servo methods useful for performing read/write head position offset correction in a rotating data storage apparatus. More specifically, the present invention comprises a unique pattern for servo burst recorded on the surface of a magnetic disk in a disk drive system.

BACKGROUND ART

Control of the read/write head position in a disk drive relative to track centerline on the disk is necessary to insure accuracy of disk drive read and write operations. Over the years, many types of servo systems have been devised to detect and correct the alignment between the read/write head and the track centerline. One type of disk drive servo system is known as a sampled servo system. In such a system, which is characteristically closed-loop or track-following, servo information in the form of magnetic burst patterns is recorded in one or more servo sectors on each track on the surface of the disk. This servo information is read by the read/write head during servo operations at each servo sector and is used to generate position error signals as a function of the misalignment between the head and the disk track centerline. The position error signals are input through a microprocessor which in turn performs appropriate calculations with the position error signals and outputs servo compensation signals which control the disk drive head positioning mechanism to place the read/write heads over track centerline.

One well known type of sampled servo system involves recording groups or bursts of magnetic transitions radially displaced from each other in the servo sector. These bursts are typically designated as the "A" burst and "B" burst. Due to the radial displacement of the "A" burst relative to the "B" burst in a given servo sector, the "A" and "B" bursts are displaced on either side of the track centerline. When the head is positioned exactly over track centerline approximately one-half of the "A" burst will be read followed by one-half of the "B" burst in a time displaced fashion. As the head moves off track, the amplitude of one burst decreases while the amplitude of the other burst increases depending on the direction of misalignment. In this manner, a position error signal can be derived from the relative amplitudes of the bursts by rectifying and peak detecting the readout from the head as it passes over the "A" and "B" bursts, and determining the difference in amplitude between the bursts.

SUMMARY OF THE INVENTION

The present invention is directed to an apparatus and method for removing undesirable magnetic and electrical offsets from the servo positioning system in a disk drive. In disk drive servo positioning systems, offset and/or gain variations in the magnetic transitions of the servo bursts or electronic offsets in the demodulation process (e.g., peak detection) can cause tracks to be "squeezed" together from their nominal valves as shown in FIG. 1C.

Further, in the removable disk servo sector positioning systems where the data may be written with one set of electronics and read/write heads, and may be read with another set of electronics and read/write heads, a write to read positioning offset can be generated by differences in electronic or magnetic offset.

Accordingly, it is an object of the present invention to provide a means to eliminate the effects of magnetic and electrical offsets in the servo positioning system. In one aspect of the present invention, an alternating servo pattern of "A" and "B" bursts is utilized wherein the "A"/"B" burst pattern is changed to a "B"/"A" burst pattern in alternating servo sectors. In another separate aspect of the present invention the outputs of the servo system demodulators (e.g. peak detectors) are switched every other servo sector between the inverting and non-inverting terminals of a differential amplifier so as to cancel out electronic offset.

In another aspect of the present invention a method of calibrating and correcting for magnetic and electric offset is disclosed, In the calibration method one or more special servo tracks are created using the alternating "AB"–"B/A" servo burst pattern as described above. The average of the position error signals for the odd numbered servo sectors is subtracted from the average of the position error signals for even numbered servo sectors and then divided by two to obtain the offset error. The error signals may be summed and averaged over one or preferably several disk revolutions. This offset signal is then subtracted from the servo position error signal so as to obtain a servo system substantially free of magnetic and electrical offset.

In another aspect of the present invention offset error correction is continuously provided for by having all the servo tracks of the disk encoded with the alternating "A/B"–"B/A" burst pattern described above. Because the sampling rate of the servo sector is much greater than the bandwidth of the servo track following system the read/write heads tend to track the nominal or ideal track centerline.

BRIEF DESCRIPTION OF THE DRAWINGS

The various objects, features and advantages of the present invention will be better understood by examining the descriptive Best Mode for Carrying out the Invention found below, together with the attached Drawings, wherein:

FIGS. 1A–1C are a representation of a prior art sampled servo system wherein magnetic distortion causes the track centerline to be offset from the nominal track centerline with the resultant "squeeze" effect on adjacent tracks.

FIG. 2 is a schematic block diagram of the closed loop servo position error correction system of the present invention.

BEST MODE FOR CARRYING OUT THE INVENTION

Figure 3:
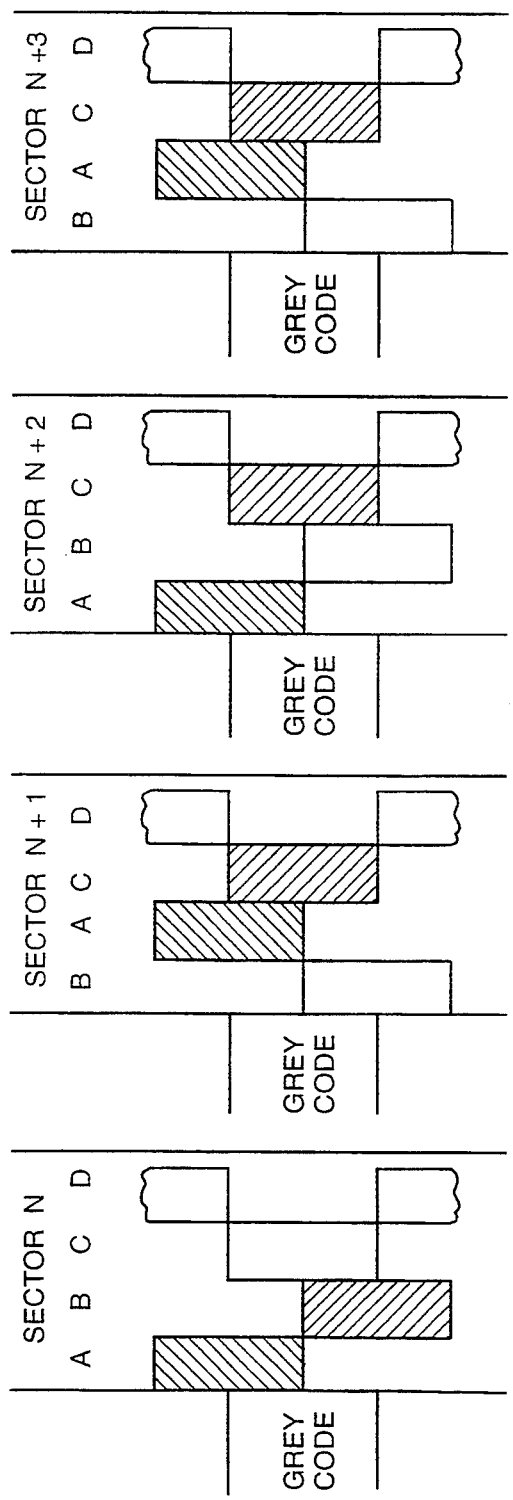
FIG. 3 shows the alternating pattern of "A" and "B" bursts in the servo pattern in an embodiment of the present invention.

The accuracy of the position error signal, that is, the degree to which the position error signal thus derived truly represents the actual misalignment between the head and track centerline is a function of magnetic matching between the "A" and "B" bursts. That is, the influence of surrounding magnetic patterns can cause distortions in the signal obtained from the read/write head as it reads the "A" and "B" bursts during servo operation. As shown in FIG. 1A, the "A" burst is specifically influenced by the magnetic transitions of the GREY code on one side and the magnetic transitions which make up the "B" burst on the other side. Similarly, the "B" burst is magnetically influenced by its surrounding neighbors consisting of the "A" burst on the one side and the so-called "C" burst used for generating quadrature information on the other side.

Because the "A" burst is surrounded by a different magnetic environment than the "B" burst, the "A" burst signal that is read by the read/write head is distorted in a slightly different fashion than the "B" burst signal read by the head. This differential distortion skews the difference signal obtained by comparing the "A" burst with the "B" burst, in turn impairing the ability of the servo system to precisely measure the extent of misalignment between the head and track centerlines. FIG. 1B shows the offset (represented by the difference between the dotted line and the solid line) to nominal track centerline created by the differential magnetic distortion of the servo pattern.

As the disk drive art advances and track density, measured in tracks per inch (TPI), continues to increase, the actual track boundaries are pushed closer and closer together. This increasing track density causes the ability to accurately determine head-to-track misalignment to become all the more important. However, the differential distortion caused by the differences in magnetic environment surrounding the "A" burst relative to the "B" burst in an "A/B" burst servo pattern arrangement tends to create overlap or "squeeze" between adjacent tracks as is shown in FIG. 1C, wherein d' is greater than d". It is therefore highly desirable to provide a means for eliminating the offset introduced by magnetic distortion of the "A/B" bursts pattern.

FIG. 2 illustrates the closed loop design of the servo system employed in the present invention to enhance the accuracy of read/write operations in a disk drive by subtracting position error offset out of the system. In FIG. 2 the "A/B" burst track locator 10 is connected to the positive terminal of summing junction 12. Head positioner 14 is connected to the negative terminal of junction 12 so that the signal generated by the head positioner 14 is subtracted from the signal generated by the "A/B" burst track locator 10 creating a position error signal as shown. The position error signal is then transmitted to the positive terminal of junction 16.

The measured offset of the system, the calculation of which will be explained herein, is transmitted to the negative terminal of junction 16 so that the measured offset of the system is subtracted from the position error signal to produce a position error signal corrected for offset as shown in FIG. 2. The corrected position error signal is then passed to a compensator 18, an amplifier 20 and a mover 22 (e.g., voice coil actuator) which in turn is connected to head positioner 14. In this manner a closed loop servo system is maintained. Such servo processing techniques are well known to those of ordinary skill in the art, and thus are not described further.

In order to cancel out the offset from nominal track centerline caused by differential magnetic distortion to the "A" burst relative to the "B" burst an alternating sequence of "A/B" bursts is utilized as shown in FIG. 3.

In servo sector N the "A" burst is neighbored on the left by the GREY code and on the right by the "B" burst. The "B" burst in servo sector N is neighbored on the left by the "A" burst and on the right by the "C" burst. The "A" burst is located above the track centerline while the "B" burst is located below it.

In servo sector N+i, the next servo sector circumferentially located on the track, the position of the "A" burst relative to the "B" burst is switched so that the "B" burst is neighbored on the left by the GREY code and on the right by the "A" burst, while the "A" burst is neighbored on the left by the "B" burst and on the right by the "C" burst. As in servo sector N, the "A" burst is located above track centerline and the "B" burst below track centerline.

This alternating pattern created by switching the position of the "A" burst relative to the "B" burst in consecutive servo sectors is repeated for all the remaining servo sectors on a given track. In a preferred embodiment each track has 60 servo sectors.

Figure 4:
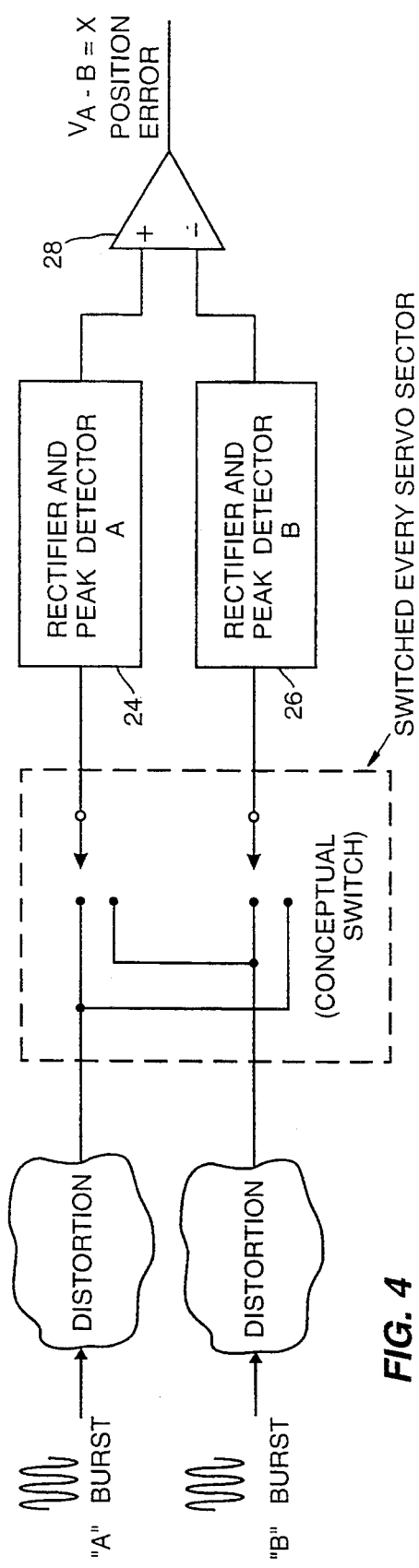
FIG. 4 is a conceptional representation of the switching effect of the alternating servo pattern of the present invention.

A conceptual representation of the function performed by alternating the relative positions of the "A" and "B" bursts in consecutive servo sectors is shown by the switching network in FIG. 4.

In FIG. 4, the "A" burst encounters distortion due to the magnetic flux generated by its surrounding neighbors. This distorted "A" burst then passes into rectifier and peak detector A 24 where its amplitude is measured. The output of rectifier and peak detector A 24 is connected to the positive terminal of differential amplifier 28. Similarly, the "B" burst is magnetically distorted (in a different amount from the "A" burst creating track offset) by its surrounding neighbors and passed into rectifier and peak detector B 26. The output of rectifier and peak detector B 26 is connected to the negative terminal of differential amplifier 28. Differential amplifier 28 generates an output signal $V_{A-B}$, i.e., the position error signal.

At every other servo sector the conceptual switch is switched such that the distorted "A" burst alternates between rectifier and peak detector A 24 or rectifier and peak detector B 26, while the distorted "B" burst alternates between rectifier and peak detector B 26 and rectifier and peak detector A 24. In this manner, the amplitudes, as measured by the peak detectors after rectification, of the "A" and "B" bursts are alternately applied to the positive and negative terminals of the differential amplifier 28 every other servo sector. Thus, the output of differential amplifier 28 ($V_{A-B}$), will alternate in polarity every servo sector.

A mathematical calibration routine may be performed during initialization of the disk drive to compensate for the measured offset of the system from the nominal or ideal track centerline. Several special servo tracks encoded with the above described alternating servo pattern are utilized with this mathematical calibration routine. During one or preferably several revolutions of the disk all the position error values for even numbered sectors are summed (accumulated), and all the position error values for the odd sectors are summed. At the end of the revolution or preferably several revolutions the summed position error values are averaged for even and odd sectors. The average of the odd sector error is then subtracted from the averaged even sector error. The result is then divided by 2 to obtain the offset due to the magnetic distortion influencing the "A" and "B" bursts.

Mathematically, the operation can be represented by the equation:

$$\text{Offset} = \frac{1}{2} \left[ \frac{\frac{\Sigma X_{2n}}{S \cdot R}}{2} - \frac{\frac{\Sigma X_{2n+1}}{S \cdot R}}{2} \right]$$

WHERE $X_{2n}$ is the position error signal for even numbered servo sectors;

$X_{2n+1}$ is the position error signal for odd numbered servo sectors;

S = the total number of servo sectors which is equal to 60 in a preferred embodiment;

n = 0, 1, 2, ... 29 in a preferred embodiment and R is equal to the number of revolutions of the disk the operation is performed over. In a preferred embodiment R > 1.

The offset obtained by performing the above calculation is then subtracted out of the position error signal as shown in FIG. 2 at 16. In this manner, a corrected position error signal is obtained so that the read/write head flies over the nominal centerline of the track. Once measured during initialization, the measured offset correction signal is maintained as a constant during disk drive operations to continuously compensate for the system offset. The measured offset value is not re-calculated until the disk drive is re-initialized.

Figure 5:
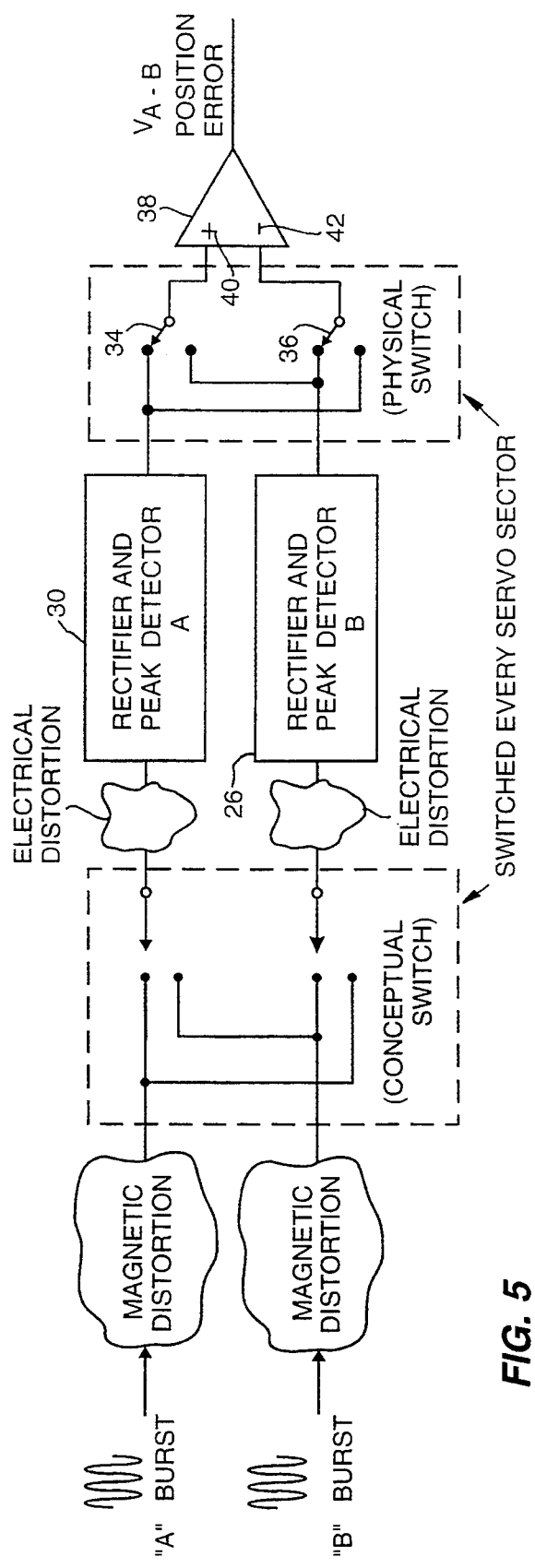
FIG. 5 shows a preferred embodiment of the present invention wherein in addition to the alternating servo pattern the output of the demodulators (e.g. peak detectors) is switched between alternating terminals of an amplifier every other servo sector by an electronic switch.

In addition to correcting for offset to the position error signal caused by magnetic distortion a switching circuit may be employed to alternately switch the outputs of demodulators (e.g. peak detectors) between the inverting and non-inverting terminals of an amplifier as shown in FIG. 5. FIG. 5 shows the same conceptual switch to represent the switching effect of the alternating servo pattern as was shown in FIG. 4. In FIG. 5 electrical distortion is generated by the differences in peak detector paths, which influences the output of rectifier and peak detectors A and B 30 and 32 in a differential manner creating a corresponding and undesirable electronic offset. At every servo sector, the rectifier and peak detectors 30 and 32 are switched or "swapped" by switches 34 and 36 so that the output of the rectifier and peak detector A is alternated between non-inverting amplifier terminal 40 and inverting amplifier terminal 42. Similarly, the output of rectifier and peak detector B 32 is switched between the inverting amplifier terminal 42 and the non-inverting inverting amplifier terminal 40. When the output of rectifier and peak detector A 30 is applied to non-inverting terminal 40 the output of rectifier and peak detector B 32 is applied to inverting terminal 42. At the next servo sector the outputs of rectifier and peak detectors A and B 30 and 32 are switched so that the output of rectifier and peak detector A 30 is applied to the inverting terminal 42 and the output of rectifier and peak detector B 32 is connected to non-inverting terminal 40. This alternating sequence continues for every servo sector on a given track. Switches 34 and 36 are preferably transistors.

Figure 6:
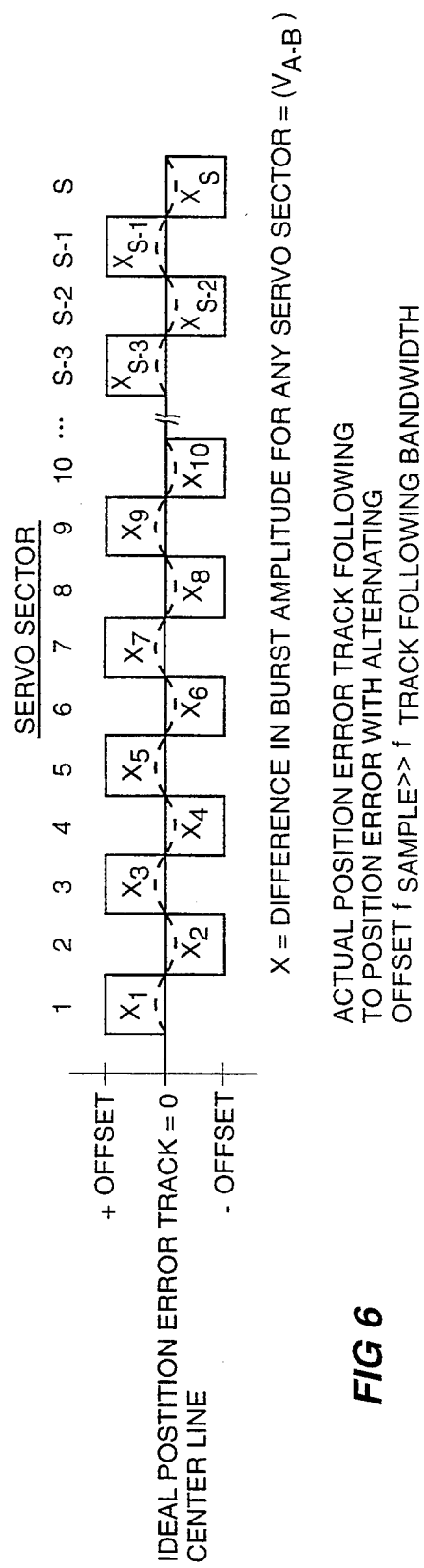
FIG. 6 shows the cancellation of magnetic and electrical offset to the nominal track centerline achieved by employing the present invention.

Instead of the calibration operation previously discussed wherein the position error offset is calibrated once during disk drive initialization and thereafter maintained, the offset position error may be continuously compensated for as shown in FIG. 6. FIG. 6 shows the alternating sequence (polarity) of offset value, created by alternating the servo pattern and rectifier and peak detector outputs as previously described. In FIG. 6 "X" represents the difference in burst amplitude for any sector, i.e., $V_{A-B}$.

Because the sampling rate of the servo sector is much greater than the track following bandwidth of the servo system, the servo system will track follow to the average of positive and negative offset which is zero, therefore maintaining an ideal track spacing. The dotted line in FIG. 6 represents the actual track following of the read/write head as it flies over the disk using the alternating servo pattern of this invention. In this manner, a separate calibration offset value need not be calculated, and correction for offset due to magnetic and electrical perturbations is continuous. Referring again to FIG. 6, it can be seen that the ability of the servo system to correct for position errors is much less than the rate at which the alternating offset ($V_{A-B}$) information is read or sampled. Because of this, the servo system responds to the alternating offset by tending to cancel it out and tracking to nominal track centerline.

It should be understood that either of the embodiments shown in the drawings and described herein could be utilized in conjunction with either method of compensating for offset, i.e., the calibration method or the continuous correction method.

While the invention is susceptible to various modifications and alternative forms, specific examples thereof have been shown by way of example in the drawings and are herein described in detail. It should be understood, however, that it is not intended to limit the invention to the particular forms disclosed, but on the contrary, the invention is to cover all modifications, equivalents, and alternatives falling within the spirit and scope of the invention as defined by the following claims.

What is claimed is:

1. A disk drive track following system for keeping a data transducer head on track, said system comprising:

a magnetic recording disk with a plurality of concentrically spaced data tracks and at least one concentrically spaced calibration track, said data tracks including a plurality of circumferentially disposed data track servo sectors arranged for periodic sampling, each of said data track servo sectors having recorded therein data track servo information in the form of servo bursts, said data tracks also including GREY code preceding said data track servo sectors;

said calibration track including a plurality of circumferentially disposed first calibration track servo sectors and a plurality of circumferentially disposed second calibration track servo sectors arranged for periodic sampling, said first calibration track servo sectors alternating with and spaced at predetermined distances from said second calibration track servo sectors, said calibration track also including GREY code preceding said first calibration track servo sectors and said second calibration track servo sectors, said first calibration track servo sectors and said second calibration track servo sectors having recorded therein calibration track servo information in the form of an alternating pattern of A bursts radially displaced outwardly from the centerline of said calibration track and B bursts radially displaced inwardly from the centerline of said calibration track, each of said first calibration track servo sectors specifically having recorded therein a single one of said A bursts following said GREY code and a single one of said B bursts following said single A burst, each of said second calibration track servo sectors specifically having recorded therein a single one of said B bursts following said GREY code and a single one of said A bursts following said single B burst;

said track following system also comprising a head positioner supporting the data transducer, a mechanical mover connected to said head positioner, and detection circuitry connected to said mechanical mover, said detection circuitry including circuit components which detect said servo bursts in said data track servo sectors on said data tracks and generate position error signals in response thereto, said position error signals representing the displacement between the data transducer and the centerline of the data tracks, said detection circuitry also including a means for generating an offset value from the detected amplitudes of said A bursts and said B bursts in said first and second calibration track servo sectors, said offset value representing the amount of offset present in said position error signals due to distortion, said detection circuitry also including means for subtracting said offset value from said position error signals to compensate for the effects of distortion.

2. The track following system of claim 1 wherein said magnetic storage disk is removable.

3. The track following system of claim 1 wherein said circuit components include peak detectors which detect said servo bursts in said data track servo sectors and which also detect the amplitudes of said A bursts and said B bursts in said first and second calibration track servo sectors.

4. The track following system of claim 3, wherein said circuit components include an amplifier.

5. The track following system of claim 4, wherein said amplifier is a differential amplifier with inverting and non-inverting terminals connected to said peak detectors.

6. A magnetic recording disk suitable for use in a disk drive with a sampled servo system, said magnetic recording disk comprising:

a plurality of concentrically spaced data tracks, said data tracks including a plurality of circumferentially disposed data track servo sectors arranged for periodic sampling, each of said data track servo sectors having recorded therein data track servo information in the form of servo bursts, said data tracks also including GREY code preceding said data track servo sectors; and at least one concentrically spaced calibration track including a plurality of circumferentially disposed first calibration track servo sectors and a plurality of circumferentially disposed second calibration track servo sectors arranged for periodic sampling, said first calibration track servo sectors alternating with and spaced at predetermined distances from said second calibration track servo sectors, said calibration track also including GREY code preceding said first calibration track servo sectors and said second calibration track servo sectors, said first calibration track servo sectors and said second calibration track servo sectors having recorded therein calibration track servo information in the form of a partially alternating pattern of A bursts radially displaced outwardly from the centerline of said calibration track, B bursts radially displaced inwardly from the centerline of said calibration track, and C bursts and D bursts positioned in quadrature fashion relative to said A bursts and said B bursts, each of said first calibration track servo sectors specifically having recorded therein a single one of said A bursts followed by a single one of said B bursts followed by a quadrature arrangement of said C and D bursts, each of said second calibration track servo sectors specifically having recorded therein a single one of said B bursts followed by a single one of said A bursts followed by a quadrature arrangement of said C and D bursts, the spatial relationship between said C and D bursts remaining constant for every one of said first and second calibration track servo sectors on each of said calibration tracks.

7. A removable magnetic recording disk suitable for use in a disk drive with a sampled servo system, said magnetic recording disk comprising:

a plurality of concentrically spaced data tracks, said data tracks including a plurality of circumferentially disposed data track servo sectors arranged for periodic sampling, each of said data track servo sectors having recorded therein data track servo information in the form of servo bursts, said data tracks also including GREY code preceding said data track servo sectors; and at least one concentrically spaced calibration track including a plurality of circumferentially disposed first calibration track servo sectors and a plurality of circumferentially disposed second calibration track servo sectors arranged for periodic sampling, said first calibration track servo sectors alternating with and spaced at predetermined distances from said second calibration track servo sectors, said calibration track also including GREY code preceding said first calibration track servo sectors and said second calibration track servo sectors, said first calibration track servo sectors and said second calibration track servo sectors having recorded therein calibration track servo information in the form of a partially alternating pattern of A bursts radially displaced outwardly from the centerline of said calibration track, B bursts radially displaced inwardly from the centerline of said calibration track, and C bursts and D bursts positioned in quadrature fashion relative to said A bursts and said B bursts, each of said first calibration track servo sectors specifically having recorded therein a single one of said A bursts followed by a single one of said B bursts followed by a quadrature arrangement of said C and D bursts, each of said second calibration track servo sectors specifically having recorded therein a single one of said B bursts followed by a single one of said A bursts followed by a quadrature arrangement of said C and D bursts, the spatial relationship between said C and D bursts remaining constant for every one of said first and second calibration track servo sectors on each of said calibration tracks.

8. A magnetic recording disk suitable for use in a disk drive with a sampled servo system, said magnetic recording disk comprising:

a plurality of concentrically spaced data tracks, said data tracks including a plurality of circumferentially disposed data track servo sectors arranged for periodic sampling, said data track servo sectors having recorded therein data track centerline information in the form of a non-alternating pattern of A bursts radially displaced outwardly from the centerline of said data tracks and B bursts radially displaced inwardly from the centerline of said data tracks, the spatial relationship between said A bursts and said B bursts in said data track servo sectors remaining constant for all of said data track servo sectors on any given data track, said data tracks also including GREY code preceding said data track servo sectors; and at least one concentrically spaced calibration track including a plurality of circumferentially disposed first calibration track servo sectors and a plurality of circumferentially disposed second calibration track servo sectors arranged for periodic sampling, said first calibration track servo sectors alternating with and spaced at predetermined distances from said second calibration track servo sectors, said calibration track also including GREY code preceding said first calibration track servo sectors and said second calibration track servo sectors, said first calibration track servo sectors and said second calibration track servo sectors having recorded therein calibration track servo information in the form of a partially alternating pattern of A bursts radially displaced outwardly from the centerline of said calibration track, B bursts radially displaced inwardly from the centerline of said calibration track, and C bursts and D bursts positioned in quadrature fashion relative to said A bursts and said B bursts, each of said first calibration track servo sectors specifically having recorded therein a single one of said A bursts followed by a single one of said B bursts followed by a quadrature arrangement of said C and D bursts, each of said second calibration track servo sectors specifically having recorded therein a single one of said B bursts followed by a single one of said A bursts followed by a quadrature arrangement of said C and D bursts, the spatial relationship between said C and D bursts remaining constant for every one of said first and second calibration track servo sectors on each of said calibration tracks.

9. A magnetic recording disk as set forth in claim 8, wherein said disk is removable relative to the disk drive.

10. A removable magnetic recording disk suitable for use in a disk drive with a sampled servo system, said magnetic recording disk comprising:

a plurality of concentrically spaced data tracks, said data tracks including a plurality of circumferentially disposed data track servo sectors arranged for periodic sampling, each of said data track servo sectors having recorded therein data track servo information in the form of servo bursts, said data tracks also including GREY code preceding said data track servo sectors; and at least one concentrically spaced calibration track including a plurality of circumferentially disposed first calibration track servo sectors and a plurality of circumferentially disposed second calibration track servo sectors arranged for periodic sampling, said first calibration track servo sectors alternating with and spaced at predetermined distances from said second calibration track servo sectors, said calibration track also including GREY code preceding said first calibration track servo sectors and said second calibration track servo sectors, said first calibration track servo sectors and said second calibration track servo sectors having recorded therein calibration track servo information in the form of an alternating pattern of A bursts radially displaced outwardly from the centerline of said calibration track and B bursts radially displaced inwardly from the centerline of said calibration track, each of said first calibration track servo sectors specifically having recorded therein a single one of said A bursts following said GREY code and a single one of said B bursts following said single A burst, each of said second calibration track servo sectors specifically having recorded therein a single one of said B bursts following said GREY code and a single one of said A bursts following said single B burst.

11. A removable magnetic recording disk suitable for use in a disk drive with a sampled servo system, said magnetic recording disk comprising:

a plurality of concentrically spaced data tracks, said data tracks including a plurality of circumferentially disposed data track servo sectors arranged for periodic sampling, each of said data track servo sectors having recorded therein data track servo information in the form of servo bursts, said data tracks also including GREY code preceding said data track servo sectors; and at least one concentrically spaced calibration track including a plurality of circumferentially disposed first calibration track servo sectors and a plurality of circumferentially disposed second calibration track servo sectors arranged for periodic sampling, said first calibration track servo sectors alternating with and spaced at a predetermined distance from said second calibration track servo sectors, said calibration track also including GREY code preceding said first calibration track servo sectors and said second calibration track servo sectors, said first calibration track servo sectors and said second calibration track servo sectors having recorded therein calibration track servo information in the form of an alternating pattern of A bursts radially displaced outwardly from the centerline of said calibration track and B bursts radially displaced inwardly from the centerline of said calibration track, each of said first calibration track servo sectors specifically having recorded therein at least one of said A bursts following said GREY code and at least one of said B bursts following said A burst, each of said second calibration track servo sectors specifically having recorded therein at least one of said B bursts following said GREY code and at least one of said A bursts following said B burst.

12. A magnetic recording disk suitable for use in a disk drive with a sampled servo system, said magnetic recording disk comprising:

a plurality of concentrically spaced data tracks, said data tracks including a plurality of circumferentially disposed data track servo sectors arranged for periodic sampling, said data track servo sectors having recorded therein data track centerline information in the form of a non-alternating pattern of A bursts radially displaced outwardly from the centerline of said data tracks and B bursts radially displaced inwardly from the centerline of said data tracks, the spatial relationship between said A bursts and said B bursts in said data track servo sectors remaining constant for all of said data track servo sectors on any given data track, said data tracks also including GREY code preceding said data track servo sectors; and at least one concentrically spaced calibration track including a plurality of circumferentially disposed first calibration track servo sectors and a plurality of circumferentially disposed second calibration track servo sectors arranged for periodic sampling, said first calibration track servo sectors alternating with and spaced at predetermined distances from said second calibration track servo sectors, said calibration track also including GREY code preceding said first calibration track servo sectors and said second calibration track servo sectors, said first calibration track servo sectors and said second calibration track servo sectors having recorded therein calibration track servo information in the form of a partially alternating pattern of A bursts radially displaced outwardly from the centerline of said calibration track, B bursts radially displaced inwardly from the centerline of said calibration track, and C bursts and D bursts positioned in quadrature fashion relative to said A bursts and said B bursts, each of said first calibration track servo sectors specifically having recorded therein a single one of said A bursts followed by a single one of said B bursts followed by a quadrature arrangement of said C and D bursts, each of said second calibration track servo sectors specifically having recorded therein a single one of said B bursts followed by a single one of said A bursts followed by a quadrature arrangement of said C and D bursts, the spatial relationship between said C and D bursts remaining constant for every one of said first and second calibration track servo sectors on each of said calibration tracks.

13. A method of removing position error offset from the position error signal of a sampled servo system in a disk drive which records on the surface of a magnetic recording disk using a data transducer head, said method including the steps of:

(a) writing servo bursts in a plurality of circumferentially displaced data track servo sectors arranged for periodic sampling in a data track on the disk, said servo bursts defining a data track centerline, (b) writing an alternating pattern of A bursts and B bursts in a plurality of circumferentially displaced first and second calibration track servo sectors arranged for periodic sampling in a calibration track on the disk such that said A bursts are radially displaced outwardly from calibration track centerline and said B bursts are radially displaced inwardly from calibration track centerline to define calibration track centerline, said alternating pattern comprising one of said A bursts preceding one of said B bursts in each of said first calibration track servo sectors and one of said B bursts preceding one of said A bursts in each of said second calibration track servo sectors;

(c) reading said first and second calibration track servo sectors to obtain, on a sector by sector basis, a calibration track position error signal comprising the difference between the detected amplitudes of said A bursts and said B bursts recorded in said first and second calibration servo sectors;

(d) computing from the obtained calibration track position error signal an offset value representing offset present in said calibration track position error signal;

(e) reading said data track servo sectors on said data tracks to obtain, on a sector by sector basis, a data track position error signal comprising the difference between the detected amplitudes of said servo bursts recorded in said data track servo sectors on said data track, and;

(f) subtracting said offset value from said data track position error signals.

14. The method of claim 13, wherein said offset value is computed during disk drive initialization.

15. The method of claim 13, wherein said computing step comprises executing a sequence of instructions stored in a memory of the disk drive.

16. The method of claim 13, wherein said computing step comprises:

(a) averaging accumulated calibration track position error signals for said first calibration track servo sectors to obtain an even sector average;

(b) averaging accumulated calibration track position error signals for said second calibration track servo sectors to obtain an odd sector average; and (d) subtracting said odd sector average from said even sector average and dividing the result by two to obtain the offset value.

17. The method of claim 13, wherein said calibration track position error signals are accumulated for said first and second calibration track servo sectors and averaged over one or more disk revolutions.

18. A method of removing position error offset from the position error signal of a sampled servo system in a disk drive which records on the surface of a magnetic recording disk using a data transducer head, the magnetic recording disk including a plurality of data tracks and a plurality of circumferentially displaced data track servo sectors arranged for periodic sampling in each of the data tracks, the servo bursts defining data track centerline, the magnetic recording disk also including at least one calibration track and a plurality of circumferentially displaced first and second calibration track servo sectors arranged for periodic sampling in each calibration track, the first and second calibration track servo sectors having recorded therein an alternating pattern of A bursts radially displaced outwardly from calibration track centerline and B bursts radially displaced inwardly from calibration track centerline in a manner which defines calibration track centerline, each of the first calibration track servo sectors specifically having recorded therein one of the A bursts followed by one of the B bursts, each of the second calibration track servo sectors specifically having recorded therein one of the B bursts followed by one of the A bursts; said method comprising the steps of:
- (a) reading the first and second calibration track servo sectors to obtain, on a sector by sector basis, a calibration track position error signal comprising the difference between the detected amplitudes of the A bursts and the B bursts recorded in the first and second calibration track servo sectors;
- (b) computing from said obtained calibration track position error signal an offset value representing offset present in said calibration track position error signal;
- (c) reading the data track servo sectors on the data tracks to obtain, on a sector by sector basis, a data recording track position error signal comprising the difference between the detected amplitudes of the servo bursts recorded in the data track servo sectors on the data track, and;
- (d) subtracting said offset value from said data track position error signals.

19. The method of claim 18, wherein said computing step comprises:
- (a) averaging accumulated calibration track position error signals for said first calibration track servo sectors to obtain an even sector average;
- (b) averaging accumulated calibration track position error signals for said second calibration track servo sectors to obtain an odd sector average; and
- (d) subtracting said odd sector average from said even sector average and dividing the result by two to obtain the offset value.

* * * * *